Patented July 29, 1924.

1,502,686

UNITED STATES PATENT OFFICE.

PHILIP SCHIDROWITZ, OF LONDON, ENGLAND, ASSIGNOR TO VULTEX LIMITED, OF ST. HELIER, JERSEY, CHANNEL ISLANDS, A JERSEY COMPANY.

MANUFACTURE OF PAPER AND OTHER FIBROUS COMPOSITIONS.

No Drawing.      Application filed September 25, 1923. Serial No. 664,767.

*To all whom it may concern:*

Be it known that I, Dr. PHILIP SCHIDROWITZ, a subject of the King of England, residing in London, England, have invented certain new and useful Improvements in the Manufacture of Paper and Other Fibrous Compositions, of which the following is a specification.

The present invention is for improvements in and relating to the manufacture of compositions, such as paper, card of other compositions in sheet or compacted form, compounded from loose or unwoven fibrous substances.

In specification of United States Patent of Jan. 23, 1923, No. 1,443,149, I have described a process for the production of a solution or colloidal suspension of vulcanized rubber in water. In brief, this process consists in direct vulcanization of rubber latex, (with or without additions thereto of other materials, such as fillers, pigments, or a colloidal substance such as casein), the latex being vulcanized without prior coagulation of the caoutchouc, and under conditions to preclude coagulation or any substantial coagulation during the vulcanization. After vulcanizing, the liquid product may be strained in order to free the vulcanized latex from suspended impurities. From the reaction product, the rubber may be separated in vulcanized form by simple evaporation of the liquid, or by addition thereto of a coagulant, such as acetic or sulphuric acid. The preparation of the vulcanized fluid may be carried out at a temperature below that ordinarily employed in hot vulcanizing processes, as is described in my concurrent application for United States Letters Patent, Ser. No. 625,171.

For convenience, the vulcanized fluid obtained according to the processes of the aforesaid U. S. specifications will be hereinafter referred to as aqueous vulcanized rubber.

According to the present invention, the manufacture of compositions from loose or unwoven fibrous materials is characterized by compounding (e. g. by impregnating or admixing) such a material with aqueous vulcanized rubber, and then depositing the vulcanized rubber in situ upon the fibrous material or said material along with the other ingredients of the composition, the deposition being most conveniently effected as a rule by addition of a coagulant.

The fibrous material may be so treated in the loose condition, or in more or less compacted form as may be desired or prove convenient.

Fibrous material of more than one kind may be employed and may be of vegetable or animal origin, and the composition may comprise fillers, colouring matter and other additions according to particular requirements.

An important feature of the present invention is the manufacture of paper characterized by incorporating or impregnating suitable fibrous material with aqueous vulcanized rubber followed by the deposition of the rubber in situ upon the solid components of the paper, for example, by addition of a coagulant. The pulp before it is made into paper sheets may be admixed with the aqueous vulcanized rubber, the rubber being deposited upon the particles of pulp and the pulp thereafter made into paper. Alternatively, the paper may be impregnated after it is made into sheet with the aqueous vulcanized rubber, and the rubber deposited either by adding a coagulant or by evaporation of the water, as in ordinary tub-sizing.

In the manufacture of compositions generally, the incorporation of the rubber-bearing fluid with the other components of the composition may be effected in any known way and at any convenient stage of manufacture. Thus, the aqueous vulcanized rubber may be worked up with the other composition ingredients, the mixture treated with a rubber coagulant and the rubberized mass then formed in any desired manner into sheets, blocks or the like. Alternatively, the coagulation or deposition of the vulcanized rubber upon or around the fibrous and other ingredients of the composition may be effected at a later stage of manufacture, for instance, while forming the mixture into sheet or other required form. The vulcanized fluid may be diluted before working up with the other composition ingredients according to the nature of the final composition, or of the particular material or materials from which it is prepared.

The following is a description by way of example of the application of the invention to the manufacture of paper, but it will be appreciated that these examples are given for illustrative purposes only, and that the invention is not limited thereby.

*Example I.*

In this example a quantity of well beaten pulp (as used in the manufacture of high grade rag paper) was diluted with water to a point where it contained 2¼% of dry fibre. To this pulp, 10% of rosin size (coagulated on the dry fibre) was added.

The vulcanized latex employed was made by taking 2000 cubic centimeters of latex, which had been preserved from coagulation by ammonia, and contained about 29 to 30% of dry rubber. 40 grammes of precipitated sulphur, 10 grammes of zinc oxide and 5 grammes of piperidine were rubbed up with 100 cubic centimeters of water containing a little ammonia until the mixture became of a creamy consistency, and this cream was admixed with the latex by thorough stirring. The whole was put in a vulcanizer and cured for 30 minutes under a pressure rising to 40 lbs. per square inch and for a further 30 minutes with the pressure maintained at 40 lbs. per square inch. The latex after vulcanization consisted of an uncoagulated aqueous suspension as set forth in United States Patent, No. 1,443,149.

The latex thus prepared was added in the proportion of 1% of dry rubber calculated on the amount of dry fibre to the paper pulp. Sufficient alum was then added to precipitate the size and to coagulate the latex. The pulp was then made into paper in the usual way.

A number of sheets of the paper thus prepared were tested for bursting strain and the average of 10 determinations gave a strain of 10.27 lbs. As compared with this result, sheets of paper prepared from the same pulp under the same conditions without latex had a bursting strain of 8.57 lbs. Sheets prepared by the incorporation of raw or unvulcanized latex had a bursting strain of 9.51 lbs.

*Example II.*

In this case the paper was prepared exactly as in Example I with the exception that 2% of rubber was employed. The paper prepared with vulcanized latex had a bursting strain of 13.31 lbs. but with raw latex only 11.42 lbs., against 8.57 lbs., for the untreated paper.

*Example III.*

In this case 4% of latex was employed and in the case of vulcanized latex the bursting strain was raised to 15.74 lbs. as against 12.03 lbs. for the raw latex.

It was found in a series of determinations ranging from 0.5% of rubber to 25% that the vulcanized latex gave an improvement over the raw latex amounting on the average to nearly 15%.

The invention provides a very simple means for the manufacture of rubberized fibrous compositions, and is particularly applicable to the rubberizing of fibrous materials the nature of which precludes or renders difficult their submission to a hot vulcanization.

In some cases where heat is permissible, deposition or separation of the rubber from the latex according to the process of the present invention may possibly be effected or improved by the aid of heat.

In using the liquid-vulcanized latex, care should be taken that no small coagulated particles or lumps of rubber are mixed with it. It may be advantageous to dilute the latex with water before admixing it with the pulp.

I claim:—

1. The process of manufacture of rubberized fibrous compositions which comprises compounding together unwoven fibrous material and aqueous vulcanized rubber and producing a deposit of the vulcanized rubber in situ upon the fibres of said material.

2. The process of manufacture of rubberized fibrous compositions which comprises compounding together a compacted unwoven fibrous material and aqueous vulcanized rubber and producing a deposit of the vulcanized rubber in situ upon the fibres of said material.

3. The process of manufacture of rubberized fibrous compositions which comprises compounding together unwoven fibrous material and aqueous vulcanized rubber and coagulating the vulcanized rubber in situ upon the fibres of said material.

4. The process of manufacture of rubberized fibrous compositions which comprises compounding together unwoven fibrous material, aqueous vulcanized rubber, and a filling agent and producing a deposit of the vulcanized rubber in situ upon said composition ingredients.

5. The process of manufacture of rubberized fibrous compositions which comprises compounding together unwoven cellulosic fibrous material and aqueous vulcanized rubber and producing a deposit of the vulcanized rubber in situ upon the fibres of said material.

6. The process of manufacture of rubberized fibrous compositions which comprises compounding together unwoven fibrous material and aqueous vulcanized rubber and producing a deposit of the vulcanized rubber in situ upon the fibres of said material while working the compounded mixture into a compacted form.

7. The process of manufacture of rubberized fibrous compositions which comprises compounding together an unwoven fibrous material and aqueous vulcanized rubber, coagulating the vulcanized rubber in situ upon the fibres of said material, removing the liquid from the compounded mass and working the latter into a compacted form.

8. The process of manufacture of rubberized paper which comprises compounding together paper ingredients and aqueous vulcanized rubber and producing a deposit of the vulcanized rubber in situ upon said ingredients.

9. The process of manufacture of rubberized paper which comprises compounding together paper ingredients and aqueous vulcanized rubber and coagulating the vulcanized rubber in situ upon said ingredients.

10. The process of manufacture of rubberized paper which comprises compounding together a pulp of paper ingredients and aqueous vulcanized rubber, coagulating the vulcanized rubber within the pulp, and working the rubberized mixture into a compacted form.

11. As a new article of manufacture, a composition compounded of unwoven fibrous material and caoutchouc directly deposited in the vulcanized state upon the fibres.

12. As a new article of manufacture rubberized paper containing vulcanized rubber directly deposited in the vulcanized form upon the paper fibres.

In testimony whereof I affix my signature.

PHILIP SCHIDROWITZ.